June 15, 1965 J. GAYNOR ETAL 3,189,481

METHOD FOR THE PREPARATION OF COPPER SULFIDE FILMS AND PRODUCTS OBTAINED THEREBY

Filed Aug. 29, 1961 2 Sheets-Sheet 1

Inventors:
Joseph Gaynor,
James F. Burgess,
Bernard C. Wagner,
by Paul A. Frank
Their Attorney.

Inventors:
Joseph Gaynor,
James F. Burgess,
Bernard C. Wagner,
by Paul A. Frank
Their Attorney.

United States Patent Office 3,189,481
Patented June 15, 1965

3,189,481

METHOD FOR THE PREPARATION OF COPPER SULFIDE FILMS AND PRODUCTS OBTAINED THEREBY

Joseph Gaynor and James F. Burgess, Schenectady, and Bernard C. Wagner, Troy, N.Y., assignors to General Electric Company, a corporation of New York Filed Aug. 29, 1961, Ser. No. 134,701
6 Claims. (Cl. 117—211)

This invention pertains to the preparation of improved copper sulfide films in situ by the conversion of certain zinc films with copper ions in a liquid medium. More particularly, the invention pertains to direct conversion of surface layer of a zinc sulfide-type compound deposited on a flexible polymeric substrate. Specifically, the present invention relates to the conversion of the major portion of a layer comprising a zinc sulfide-type compound by contacting the layer with a liquid solution of copper ions thereby producing a surface film which is primarily copper sulfide and has unexpectedly improved physical properties including optical transmission and stability.

Recently, a method for the direct preparation of electrically conducting copper sulfide films on a polymeric substrate has been disclosed in the prior copending application of D. A. Cusano et al., now Patent No. 3,095,324, entitled, "Electrically Conducting Films," and assigned to the assignee of the present invention. In the Cusano application, a layer of a zinc sulfide-type compound is deposited on a substrate and the layer subsequently converted in situ by replacing the cation of the zinc sulfide-type compound with a different metallic cation to form a surface-adjacent film of a substance having low electrical resistance. For example, the preparation of a preferred conducting surface layer is obtained by contacting the zinc sulfide-type compound with a liquid solution of copper ions for a period of time sufficient to convert a portion of the layer to copper sulfide. The converted copper sulfide films are found to possess electrical conductivity and optical transmission characteristics which make them especially suitable as the conducting layer in a thermoplastic information recording medium of the type disclosed and claimed in the copending application of W. E. Glenn, now Patent No. 3,113,179, and assigned to the assignee of the present invention.

In one embodiment of the thermoplastic recording medium of the Glenn invention, a composite tape comprising a polymeric support layer, a conducting inner layer, and a thermoplastic recording layer is charged with an electrostatic pattern representative of the information to be stored. The charged thermoplastic recording layer is then heated above its softening point to produce deformations in the thermoplastic layer according to the electrostatic charge pattern. The liquid thermoplastic recording layer having deformations is subsequently cooled to preserve the information permanently in the recording medium. The conducting layer in the composite tape provides means for rapidly heating the recording layer above its softening point by direct resistance or radio frequency heating and also serves as a ground plane for deposition of the electrostatic charges. In such an application, it will be desirable for the conducting layer to possess uniform electrical resistance, exhibit good adherence to the substrate, and have sufficient electrical conductivity for grounding the electrostatic charges. A convenient method for the retrieval of information from the deformed storage medium is to project a light beam completely through the entire recording medium whereby the light beam is deflected or defracted by the information bearing deformations to produce a spatial visable image. For efficient employment of this read-out method, it is advantageous for all members of the composite tape to be optically transparent so that the conducting layer should possess high transparency to light, especially visible light.

There are still many problems associated with the converted copper sulfide films prepared by the above described process on a flexible polymeric substrate. In this process, coatings of the zinc sulfide compound having a thickness of about 1000 angstroms or greater are deposited on the polymeric substrate and the surface portion of the layer converted to copper sulfide. Layers of this thickness are prone to cracking or crazing if associated with thin flexible substrates even during ordinary handling of the composite member. Deposition of a zinc sulfide-type compound from the vapor phase also requires sufficient heating of the deposited material so that a deposit in the mentioned thickness range develops permanent stresses due to differences in thermal expansion between the deposited material and the substrate. These stresses are sufficient to cause spalling or crazing of the layer. Heat treatment of the layer for removal of stress is not possible because annealing temperatures are well above the liquid temperatures for the polymers employed as the substrate material. Still further problems are associated with a conversion of the conventional films which can be attributed to the thickness of the zinc sulfide layer. For example, thick films are more subject to loss of integrity and removal from the substrate during immersion in the liquid converting medium than thin films even with careful handling of the composite member. Additionally, conversion of a major portion of the layer to copper sulfide is not readily achieved with the layers now being applied.

While the conventional converted films are generally transparent over the entire visible spectrum, the films exhibit certain selective light absorption that reduces the total amount of all visible light which can be projected through the film. The selective absorption of light in the visible spectrum for a particular material is primarily a characteristic of the material composition. Although the total amount of light transmitted through a transparent absorbing medium can be adjusted with the thickness of the medium, it would be advantageous to reduce the selective absorption characteristics of the medium to facilitate greater total passage of visible light. For the particular converted films of the invention, it has been found, surprisingly, that selective absorption in the visible spectrum is substantially absent. Thus, the converted films of the present invention transmit more visible light because of characteristically different light absorptive properties for the compositions.

It has not been possible heretofore to deposit satisfactory layers of the zinc sulfide-type compound directly upon a polymeric substrate below a minimum thickness of around 500 angstroms. Extensive experience with the vapor deposition of both zinc sulfide and cadmium sulfide resulted only in non-uniform deposits below the minimum specified thickness. The variation in thickness for these extremely thin layers included large areas of the polymeric substrate void of any deposited material. Other portions of the substrate contained deposits less than 50 angstroms thick which were removed from the substrate during the conversion process by an undercutting action of the liquid copper solution. Thus, circumvention of the problems associated with the conventional converted films by reducing film thickness cannot be achieved by known techniques.

It is the primary object of the invention, therefore, to provide stable converted copper sulfide films on a polymeric substrate having improved physical properties, especially optical transmission in the visible spectrum.

It is another important object of the invention to provide an improved information recording medium for the storage of information in the form of light modifying deformations.

It is still a further important object of the invention to provide a flexible polymeric tape having a stable electrically conducting film deposited thereupon exhibiting improved physical properties, especially optical transmission in the visible spectrum.

A still further important object of the invention is to provide a modified method for the preparation of a converted copper sulfide film which facilitates continuous and rapid deposition of a zinc sulfide-type compound on a polymeric substrate.

These and other important objects of the invention will be apparent from the following description.

Briefly, the invention comprises the deposition of a zinc sulfide-type compound on a flexible polymeric substrate which has been specially treated to facilitate the deposit of an extremely thin uniform layer of the material. More particularly, the polymeric substrate upon which the zinc sulfide-type compound is deposited is first nucleated with non-continuous deposits of a low-surface mobility metal in the form of small individual islands over the complete surface to be coated. Nucleation of the polymer receptor surface in this manner before deposition of the zinc sulfide layer permits rapid and uniform dispersal of the deposited material on the surface so that thinner continuous films having the desirable properties hereinbefore mentioned can be obtained. Furthermore, it is now possible to deposit the zinc sulfide-type compound on a polymeric tape at speeds up to about 180 feet per minute which facilitates continuous preparation and conversion of the deposited layer. The nucleation of glass and metal substrates with metal nuclei is known for the purpose of conditioning these substrates for subsequent deposition of uniform metal films by vacuum deposition. While the nucleation and subsequent deposition of extremely thin uniform films on a polymer surface may appear to be an analogous process, inherent differences between the substrates requires a basically different approach to the problem. Both glass and metal substrates have crystalline surfaces which provide attachment sites for the deposited metal atoms. In contrast thereto, the non-crystalline surface of a polymeric substrate is much less receptive to any attachment of the deposited atoms even after careful cleaning. The conventional preparation of a polymer surface for vacuum deposition of a metal film employs an adhesive base coating often including mechanical or solvent roughening of the surface. Since the conventional process requires additional liquid handling and drying equipment, it would be desirable to condition the surface by a method employing the same vapor deposition equipment normally employed to deposit the zinc sulfide-type compound. Furthermore, while the conventional conditioning process has been found adequate for the subsequent deposition of relatively thick (<1500 angstroms) metal films, it is not suitable for uniform films of the zinc sulfide compound in the thickness range of the invention.

The invention may be practiced in its preferred embodiments as illustrated in the following description, taken in connection with the accompaning drawings in which.

A 100 micron thick polyethylene terephthalate tape was nucleated with an approximately 8 angstroms thick deposit of copper by ordinary vacuum deposition techniques wherein the surface of the tape was exposed to copper vapors in an evacuated bell jar simply by passing the tape over a molten bath of copper. The polyethylene terephthalate tape used was a commercial product of the E. I. du Pont de Nemours and Company, Inc., and sold under the registered trademark "Cronar" and consisted of a polyethylene terephthalate material containing small intercondensed residues from dihydric alcohols such as polypropylene glycol-1,3. Representative conditions employed to nucleate the tape are listed in Table 1 below together with the thickness of the nucleation deposits obtained. Next, an approximately 250 angstroms thick cadmium sulfide layer was deposited on the nucleated tape by vacuum evaporation of sintered cadmium sulfide from a 1 inch diameter, 1½ inch long boat placed at a distance of about approximately 2⅜ inches away from nucleated tape surface. Volatilization of the cadmium sulfide was accomplished with resistance heating by means of a 0.060 inch diameter tantalum wire coil surrounding the boat. The power input to the resistance coil during deposition of the cadmium sulfide layer was approximately 175 watts. The speed of the tape over the boat during the deposition was maintained at about 150 feet per minute. Satisfactory vacuum conditions in the bell jar for both nucleation and deposition of the zinc sulfide-type compound was produced at $10^{-4}$–$10^{-6}$ millimeters of mercury pressure. A tightly adherent uniform layer of cadmium sulfide was obtained having individual crystalline diameters less than 150 microns.

*Table 1*

| Thickness of Nucleation Deposit (angstroms) | Boat Power [1] (watts) | Tape Speed (Feet per minute) |
|---|---|---|
| 12 | 202 | 180 |
| 10 | 225 | 180 |
| 8 | 208 | 117 |
| 5 | 207 | 150 |
| 8 | 151 | 90 |
| 5 | 151 | 122 |
| 2 | 142 | 180 |
| 8 | 167 | 180 |

[1] Boat power indicates the electrical power supplied to a 0.060 inch diameter tantalum resistance coil surrounding a 1 inch diameter, 1½ inch long boat containing copper.

Figures 1, 2:
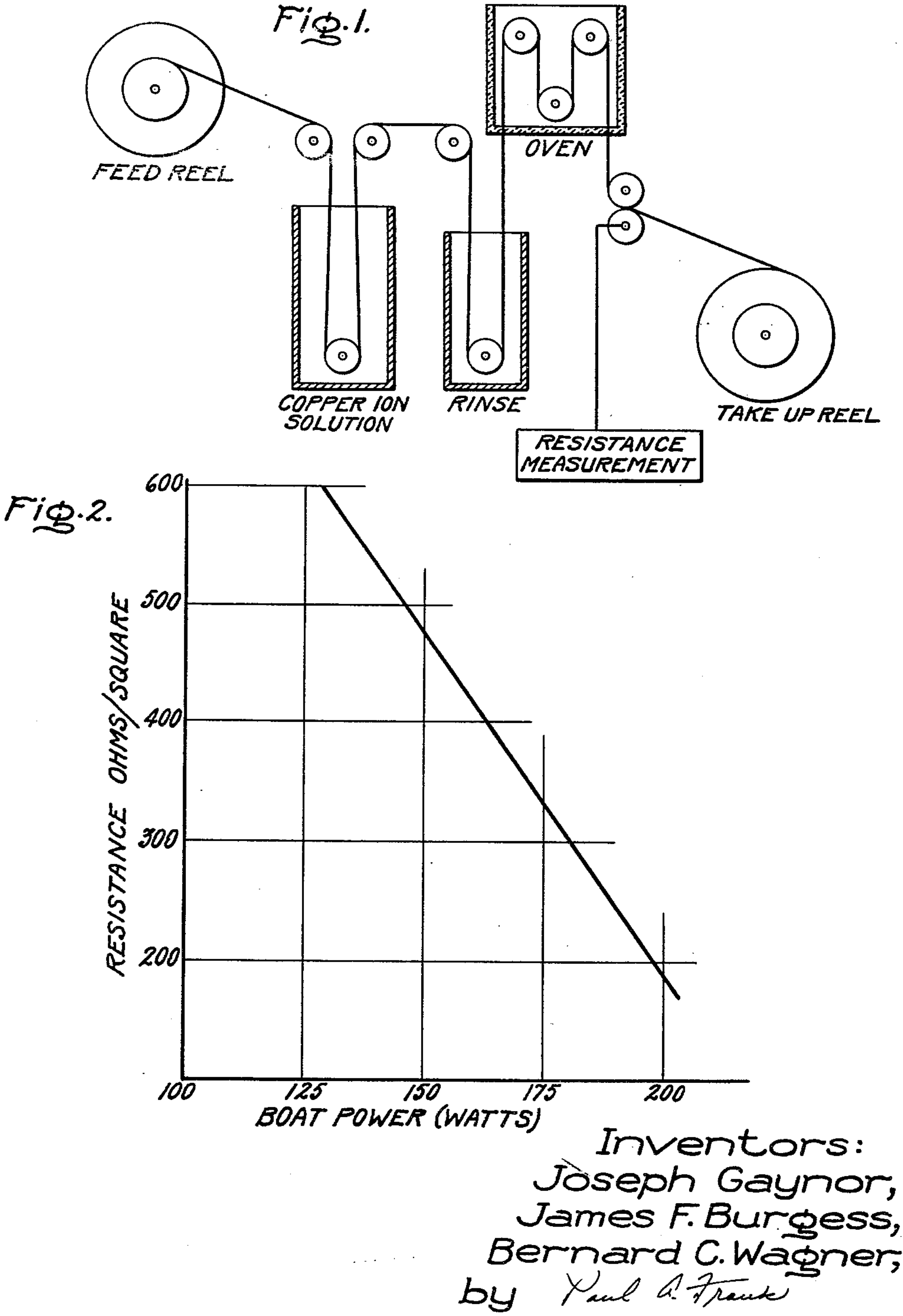
FIGURE 1 is a schematic representation of one form of apparatus for carrying out the direct conversion of a deposited layer of the zinc sulfide-type compound on a continuous polymeric tape.
FIGURE 2 illustrates the relationship between the electrical resistance of an approximately 250 angstroms thick cadmium sulfide layer after conversion to copper sulfide and the nature of the cadmium sulfide layer.
Figure 3:
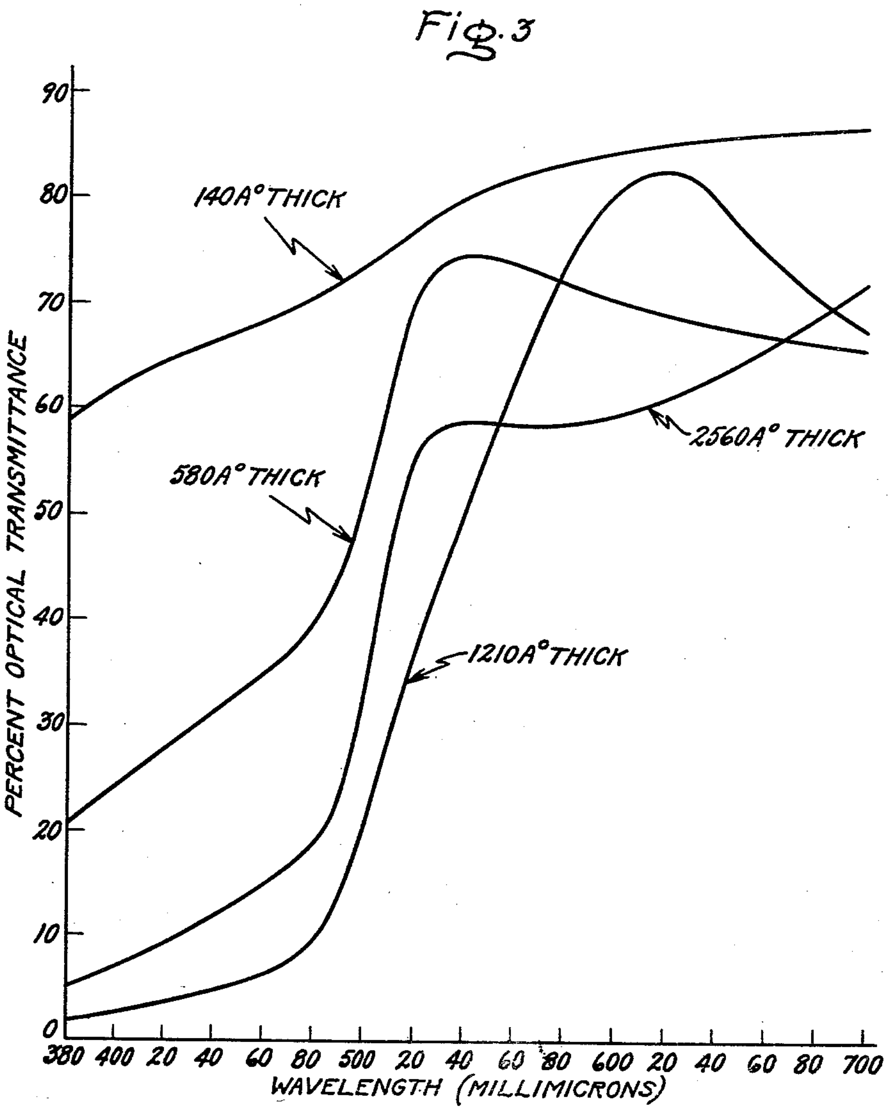
FIGURE 3 illustrates the optical transmission for a typical copper sulfide film prepared according to the invention compared to conventional copper sulfide films.

The conversion of the cadmium sulfide layer to copper sulfide was performed continuously in the apparatus of FIGURE 1. Accordingly, the rolled tape having the above cadmium sulfide layer was unwound and immersed directly into a vessel containing an approximately 0.1 molar aqueous copper acetate solution at a temperature of about 80° C. The tape was fed continuously through the solution for a total contact time in the solution of approximately 36 seconds. Upon emergence from the copper solution, the tape was immediately given a water rinse to remove excess metal ions from the surface of the converted layer. After removal from the rinse water, the tape was passed through an air-circulated drying oven for thorough drying and thereafter rewound for storage. As illustrated in FIGURE 1, electrical resistance measurements were made on the converted films prior to rewinding the tape by means of passing the tape over a roller connected to a measuring circuit.

A certain, definite relationship exists between the final electrical resistance of the converted copper sulfide film and the nature of the zinc sulfide-type compound deposit as illustrated by reference to FIG. 2. In FIGURE 2 there is shown the variation in said electrical resistance with the power furnished to the particular resistance coil employed in the above embodiment. The data represents measurements made on various 250 angstroms thick cadmium sulfide layers converted under approximately identical conditions. From these results, it can be said that the rate of evaporation for the zinc sulfide-type compound has an apparently uniform linear effect upon the resistance of the converted product. This is not to say that non-uniform films are obtained at any given power input since the variation in final resistance amongst different tapes at a given set of conditions has always been less than 10%.

In another embodiment of the invention, an approximately 400 angstroms zinc sulfide layer was deposited on a 100 micron thick polyethylene terephthalate tape nucleated with a 4 angstroms thick copper deposit prior to the deposition of the zinc sulfide layer. The method for both nucleation of the tape and deposition of the zinc sulfide layer followed the general procedure described in the preceding embodiment except that a lower tape speed and higher power input to the resistance coil was made in a conventional manner to obtain a relatively thicker deposit. Conversion of the major portion of the zinc sulfide layer was accomplished in the apparatus in FIGURE 1 employing an aqueous solution of the type described in the copending Cusano application.

The products of the invention comprise a transparent composite flexible polymeric tape having an electrically conductive coating of partially converted zinc sulfide-type compound overlying a nucleation deposit of a low-surface mobility metal upon the surface of the tape. The products can be especially characterized by the physical properties of the electrically conducting surface coatings which supply the novel characteristics to the composite article. For example, the electrical resistance of the present copper sulfide outer layer in the coating ranges from about $10^2$ ohms per square to about $10^4$ ohms per square, whereas the electrical resistance of the polymeric substrate is in the order of about $10^{12}$ ohms per square. The optical transmission for the composite article in the visible spectrum ranges from about 50–90% of the transmission for the base tape depending upon the thickness of the converted zinc sulfide-type compound layer. This compares with transmissions ranging from about 2–83% for the conventional coatings depending both upon the thickness and the selective absorption of the coating. The coatings of the present invention can further be characterized as stable, continuous layers having a total thickness of about 50 angstroms to about 400 angstroms and comprising generally an under layer of the original zinc sulfide-type compound with a surface conducting layer of copper sulfide, the surface layer making up at least 50% of the total thickness of the coating. In further explanation, conversion of a layer of the zinc sulfide-type compound having the minimum specified thickness yields a film which is substantially all converted. Conversion of progressively thicker films in the specified range yields proportionately less copper sulfide layer although in all thicknesses, the proportion of copper sulfide layer exceeds the unconverted zinc sulfide layer. The uniformity in electrical resistance at different areas in a given copper sulfide layer is often beyond the sensitivity of conventional measuring circuits so that reproducibility in electrical resistance is within a few percent of the average for the specific conversion conditions employed. The chemical composition of the conducting portion of the film comprises monovalent copper sulfide having a structural formula of $Cu_2S$ and $Cu_9S_5$. Minor constituents in the conducting layer may include bivalent cupric ions in the form of cupric sulfide and residual zinc sulfide-type compound.

The zinc sulfide-type compounds which can be converted in situ to yield the improved transparent, electrically conducting surface layers are characterized as having a cation from Group IIB of the periodic table excluding mercury and a non-metallic anion from Group VI of the periodic table other than polonium. Suitable compounds are well known luminescent and cathode luminescent materials and include compounds having a cation selected from the group consisting of zinc, cadmium, and mixtures thereof and an anion selected from the group consisting of sulfur, selenium, tellurium, and mixtures thereof. The use of the phrase "and mixtures thereof" indicates the inclusion in this group of complex compounds such as zinc-cadmium sulfide, zinc-cadmium selenide, zinc sulfo-selenide, cadmium sulfo-selinide, zinc cadmium sulfo-selenide, and the like. The formation of thin transparent films comprising microcrystalline deposits of the suitable materials on a thin polymeric substrate is known, as for example, by vapor reaction of a zinc or cadmium containing compound with the sulfide, selenide, or telluride gas in the vicinity of the heated substrate such as is described in the Cusano Patent 2,732,313. It will be realized, of course, that for thermoplastic type substrates such as polyethylene terephthalate, polyvinyl chloride, polyvinylidene chloride, certain polyesters and polycarbonates, heating the substrate above the fluid temperature should be avoided to prevent plastic flow. The preferred zinc sulfide-type materials are those with the cation possessing the approximate ionic radius of copper which permits faster reaction rate during the conversion step. Consequently, cadmium sulfide with an ionic radius of approximately 0.97 is preferable to zinc sulfide with an ionic radius 0.74 since the ionic radius of copper is 0.96.

Suitable solutions for conversion of the zinc sulfide-type compound to copper sulfide are prepared with soluble copper compounds including copper acetate, copper sulfate, copper chloride, copper bromide, copper nitrate, copper iodide, copper carbonate, copper acetylacetonate and an inert polar solvent. The solvent is preferably water but may as well be an organic polar liquid such as ethyl alcohol, methyl alcohol, ethylene glycol, or any similar polar solvent which does not inhibit transfer of the metallic ions between the solution and the zinc sulfide-type compound surface or react chemically with the solute or the zinc sulfide-type compound layer to an extent to prevent the formation of the conducting film which will destroy the zinc sulfide-type layer. Extreme acidic solution, therefore, should not be used and the pH of the slution should be between about 4–8. The conversion of zinc sulfide-type compound to copper sulfide is facilitated by the presence of monovalent cuprous ions in the conversion solution so that it is desirable to include such reducing agents as hydrazine sulfate and sodium hyposulfite in the solution when a divalent copper compound is used for the conversion. It may also be desirable to add such complexing agents as pyridine, ammonia, aniline, quinoline, thiourea, and other well-known complexing agents, when monovalent copper compounds are employed for the conversion, in order to increase the solubility of certain, only sparingly soluble, monovalent copper compounds. The concentration of the copper ion in solution is not believed critical and has no effect on the reaction over the concentration range 0.01–1 molar solutions.

Suitable nucleating agents for deposition of the polymeric substrate surface are metals having sufficient volatility to be vaporized by ordinary vacuum deposition techniques and which form stable deposits on the polymeric surface. The latter identifying characteristics can be further amplified as low-surface mobility for individual metal atoms so that the deposits do not thereafter migrate with heating of the polymeric substrate and disturb the stability of the overlying layer of the zinc sulfide-type compound. More particularly, the deposits of the nucleating material can be described as approximately 2–12 angstroms thick islands of the material on the receptor surface of the polymeric substrate. The stability or the low-surface mobility of the nucleation deposits depends upon adequate bonding of the metal atoms to the polymeric substrate and will be influenced by such factors as the condition of the substrate and the tendency of the metal atoms to re-evaporate. While the exact mechanism of nucleation is not known at the present time so that the applicants are not desirous of limiting the invention to any particular theoretical considerations, a certain relationship between the polymer and the nucleating atoms is believed necessary for successful nucleation. Greater stability of the nucleation deposit can be expected if the latent heat of evaporation for a metal atom in the deposit is greater than the latent heat of evaporation of a metal atom from the substrate itself, thereby minimizing migration of atoms in the deposit to the substrate. A more detailed description of the phenomenon is found on pages 199–206 of "Vacuum Deposition of Thin Films," by L. Holland, John Wiley and Sons (1958). Specific nucleating agents for useful polymeric substrates including polyethylene terephthalate, polyvinyl chloride, polyvinylidene chloride, polyesters, or polycarbonates can be selected from the group consisting of silver, chromium, copper, tungsten, and platinum. In contrast thereto, high-surface mobility metals such as cadmium, zinc, bismuth, tin, and gold are not satisfactory nucleating agents for the useful polymeric substrate. The preferred nucleating agents are metals which in the thickness range of the nucleation deposits exhibit the highest optical transmission and of the five specific nucleating agents disclosed, copper has the highest optical transmission.

It is not intended to limit the invention to the conditions for deposition of the zinc sulfide-type compound and its subsequent conversion to copper sulfide mentioned in the above preferred embodiments. Suitable conditions for the deposition of a satisfactory cadmium sulfide or zinc sulfide layer are well known and alternate procedures to the method of the Cusano Patent 2,732,313 are set forth in U.S. Patents 2,732,312—Young et al. and 2,867,541—Coghill et al. In all such methods of deposition, heating of the substrate must not exceed the fluid temperature of the polymeric substrate which for Cronar is under 150° C. The conversion of the deposited zinc sulfide-type compound by dissolved copper ions takes place at room temperature with increasing reaction rate as the temperature of the solution is increased. The limitation on solution temperature is once again the fusion of the polymeric substrate or vaporization of constituents in the solution. Whereas the degree of conversion is a function primarily of the solution temperature rather than solution concentration and residence time in the solution, for the thin zinc sulfide-type compound layers of the present invention, the conversion of more than half of the layer thickness can be achieved at processing speeds up to at least 180 feet per minute. The rapid conversion of the layer facilitates continuous deposition and conversion of the layer.

From the foregoing description, it will be apparent that improved flexible, transparent, electrically conducting zinc sulfide films on a flexible polymeric substrate have been provided. It is not intended to limit the invention to the preferred embodiments above shown, since it will be obvious to those skilled in the art that certain modifications of the present teaching can be made without departing from the true spirit and scope of the invention. It is intended to limit the present invention, therefore, only to the scope of the following claims.

What we claim as new and desire to secure by Letters Patent of the United States is:

1. A method for the preparation of a transparent electrically conducting film on a flexible polymeric substrate which comprises nucleating the receptor surface of the substrate with a low-surface mobility metal, vapor depositing a crystalline layer approximately 50 to 400 angstroms thick of a first compound selected from the group having a cation selected from the group consisting of zinc, cadmium, and mixtures thereof and an anion selected from the group consisting of sulfur, selenium, tellurium, and mixtures thereof on the receptor surface of the substrate, and contacting the crystalline layer with a liquid solution of copper ions for a period of time sufficient to convert at least the major portion of the crystalline layer to an electrically conducting copper compound film wherein copper ions are substitued for cations of said first compound.

2. A method for preparing a transparent electrically conducting copper sulfide film on a flexible polyethylene terephthalate substrate which comprises evaporating an approximately 2–12 angstroms thick nucleation deposit of a low-surface mobility metal selected from the group consisting of silver, chromium, copper, tungsten, and platinum on the receptor surface of the substrate, vapor depositing a crystalline layer approximately 50 to 400 angstroms thick of a compound selected from the group having a cation selected from the group consisting of zinc, cadmium, and mixtures thereof and an anion selected from the group consisting of sulfur, selenium, tellurium, and mixtures thereof on the receptor surface of the substrate, and contacting the crystalline layer with a liquid solution of copper ions for a period of time sufficient to convert substantially all of the crystalline layer to an electrically conducting copper compound formed by the substitution of copper ions for cations of the original compound.

3. A composite flexible tape which comprises a transparent polymeric support layer, an approximately 2–12 angstroms thick nucleation deposit of a low-surface mobility metal upon the surface of the support layer, an approximately 50–400 angstroms thick stable transparent layer of a partially converted crystalline compound selected from the group having a cation selected from the group consisting of zinc, cadmium, and mixtures thereof and an anion selected from the group consisting of sulfur, selenium, tellurium, and mixtures thereof overlying the nucleation deposit, the partially converted layer being characterized by the absence of substantial selective light adsorption in the visible spectrum and comprising an under layer of the compound having an outer surface layer wherein copper ions are substituted for cations of the compound.

4. A composite flexible tape which comprises a transparent polymeric support layer, an approximately 2–12 angstroms thick nucleation deposit of a metal selected from the group consisting of silver, chromium, copper, tungsten, and platinum upon the surface of the support layer, an approximately 50–400 angstroms thick stable transparent layer of a partially converted crystalline compound selected from the group having a cation selected from the group consisting of zinc, cadmium, and mixtures thereof and an anion selected from the group consisting of sulfur, selenium, tellurium, and mixtures thereof overlying the nucleation deposit, the partially converted layer being characterized by the absence of substantial selective light adsorption in the visible spectrum and comprising an under layer of the compound having an outer surface layer of an electrically conducting copper compound formed by the replacement of cations of the original compound by copper ions.

5. A composite flexible tape which comprises a transparent polyethylene terephthalate support layer, an approximately 2–12 angstroms thick nucleation deposit of a metal selected from the group consisting of silver, chromium, copper, tungsten, and platinum upon the surface of the support layer, an approximately 50–400 angstroms thick stable transparent layer of a partially converted crystalline compound selected from the group having a cation selected from the group consisting of zinc, cadmium, and mixtures thereof and an anion selected from the group consisting of sulfur, selenium, tellurium, and mixtures thereof overlying the nucleation deposit, the partially converted layer being characterized by the absence of substantial selective light adsorption in the visible spectrum and comprising an under layer of the compound and an outer surface layer of an electrically conducting copper compound formed by the replacement of cations of the original compound by copper ions.

6. In an information storage medium of the type comprising a transparent flexible polymeric support layer, a transparent conducting layer, and a transparent thermoplastic recording layer, the improvement which comprises having as the conducting layer approximately 50 to 400 angstroms thick a stable transparent layer of a partially converted crystalline compound selected from the group having a cation selected from the group consisting of zinc, cadmium, and mixtures thereof and an anion selected from the group consisting of sulfur, selenium, tellurium, and mixtures thereof overlying a nucleation deposit of a low-surface mobility metal on the surface of the support layer, the partially converted layer being characterized by the absence of substantial selective light adsorption in the visible spectrum and comprising an under layer of the compound having an upper layer of an electrically conducting copper compound formed by the replacement of cations of the original compound by copper ions.

References Cited by the Examiner

UNITED STATES PATENTS

| | | | |
|---|---|---|---|
| 2,702,760 | 2/55 | Barth | 117—71 X |
| 2,709,663 | 5/55 | McLean et al. | 117—71 X |
| 2,740,732 | 4/56 | Peck et al. | 117—211 X |
| 2,968,583 | 1/61 | Barth | 117—213 |
| 3,035,944 | 5/62 | Sher et al. | 117—217 X |
| 3,095,324 | 6/63 | Cusano et al. | 117—215 |

RICHARD D. NEVIUS, *Primary Examiner.*

JOSEPH B. SPENCER, *Examiner.*